J. SCHEEPER.
Securing Hubs on Axles.
No. { 3,011. }
{ 34,015. }
Patented Dec 24, 1861.
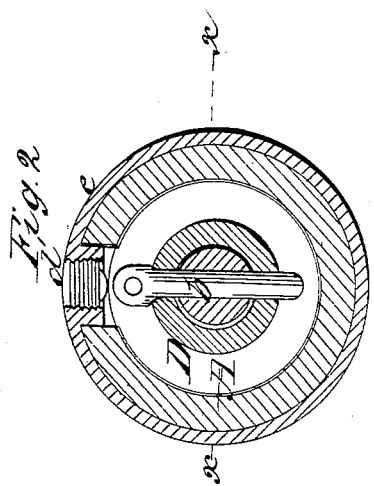
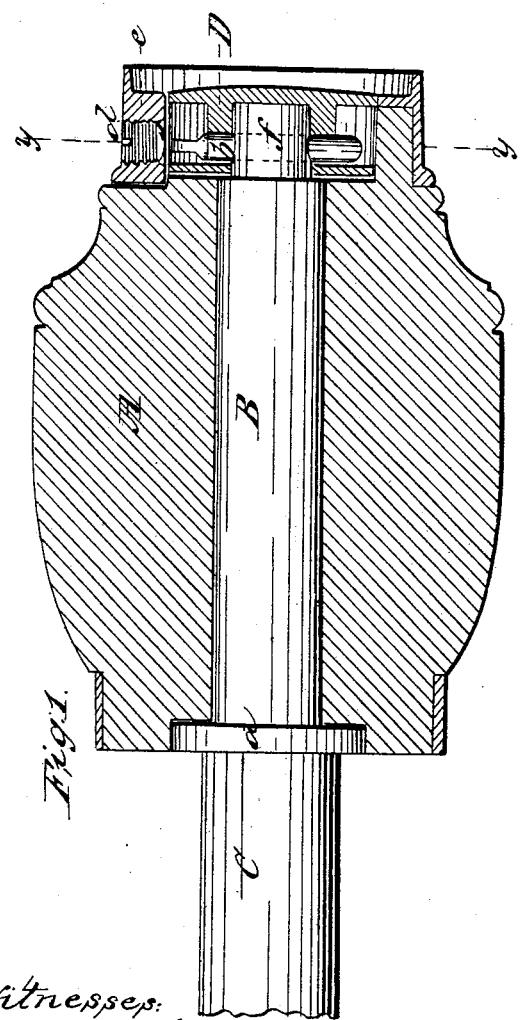
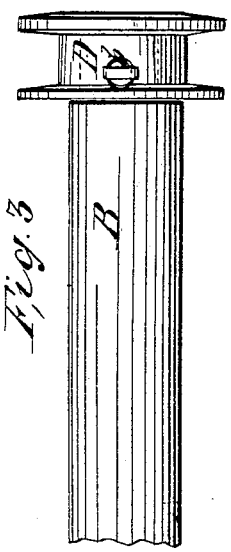
Witnesses:
James Laird
James H. Lindley
Inventor:
John Scheeper

UNITED STATES PATENT OFFICE.

JOHN SCHEEPER, OF NEW YORK, N. Y.

IMPROVEMENT IN MODE OF SECURING CARRIAGE-WHEEL HUBS TO AXLES.

Specification forming part of Letters Patent No. 34,015, dated December 24, 1861.

*To all whom it may concern:*

Be it known that I, JOHN SCHEEPER, of No. 16 Minetta Lane, in the city, county, and State of New York, have invented a new and Improved mode of Securing Carriage-Wheel Hubs on Axles; and I do hereby declare the following to be a full, clear, and exact description of the same, reference being had to the accompanying drawings, making a part of this specification, in which—

Figure 1 represents a longitudinal section of a hub, taken at the line $x\,x$ of Fig. 2, secured on an axle. Fig. 2 represents a transverse section of the same, taken at the line $y\,y$ of Fig. 1. Fig. 3 represents a fragment of an axle and the fastening.

Similar letters of reference indicate corresponding parts in the several figures.

The nature of this invention consists in a simple and efficient device for securing carriage-wheel hubs on their axles, whereby the attachment is made more secure and the wheel prevented from casually working loose, while lateral movement of the hub on its axle is also prevented without interfering with the free rotary movement of the hub, at the same time giving a neater and better finish to the hub of the wheel, as will be hereinafter fully explained.

To enable others skilled in the art to fully understand and construct my invention, I will proceed to describe it.

A represents the hub of a carriage-wheel of the usual shape, fitted upon the journal B of an axle C, which is provided with a collar $a$ at its junction with the journal B, which collar is embedded in the butt-end of the hub when it is secured in position on the axle. The small or opposite end of the hub has a band $e$, secured upon it in the usual manner, to prevent the hub from cracking and to make a better finish. The outer end $f$ of the axle projects through the hub of the wheel, and is made somewhat smaller in diameter than the journal thereof. A flanged cap D is fitted upon this small end, so as to have its outer surface flush with the face of the band or end of the hub, and is secured thereon by means of a pin $b$, which is passed vertically through it and through the axle. The hub is recessed out at its small end to allow it to revolve freely around the circular flanges of the cap D. The upper end of the pin is furnished with an eye and is introduced into an opening in the cap and axle from above through a hole in the band, which is afterward closed by a short screw $d$ to prevent any dust or dirt from getting in between the working-surfaces of the hub and axle.

When it is desired to detach the hub of the wheel from the axle, it is turned around until the screw in the band is brought immediately over the pin $d$ or in a vertical position, when it is unscrewed and taken out and the pin withdrawn by means of a piece of wire with a short crook in one end, when the hub is free to be removed from the axle for the purpose of lubricating or cleaning the same or for any other purpose desired. The inner flange of the flanged cap D furnishes a good lateral bearing for the hub. The pin $b$, being passed vertically through the cap and axle from the upper side and always remaining stationary, cannot be shaken out by any motion of the running-gear of the carriage or the fastening become casually disengaged, thus preventing all liability of accident from the wheel running off.

The above-described improvement in the mode of securing hubs on axles is simple in its construction and can be applied to any kind of vehicle at a small expense.

Having thus described my invention, what I claim as new, and desire to secure by Letters Patent, is—

The hub A, axle-journal B, flanged cap D, pin $b$, collar $a$, band $e$, and screw $d$, when combined, arranged, and operating in the manner substantially as described.

JOHN SCHEEPER.

Witnesses:
    JAMES H. MIDLEY,
    JAMES LAIRD.